(12) United States Patent
Kong et al.

(10) Patent No.: US 12,351,133 B2
(45) Date of Patent: Jul. 8, 2025

(54) MOVING DEVICE

(71) Applicants: Hyundai Motor Company, Seoul (KR); Kia Corporation, Seoul (KR); NIFCO KOREA Inc., Chungcheongnam-do (KR)

(72) Inventors: Byung Seok Kong, Gyeonggi-do (KR); Geun Heung Kim, Chungcheongnam-do (KR)

(73) Assignees: Hyundai Motor Company, Seoul (KR); Kia Corporation, Seoul (KR); NIFCO KOREA Inc., Chungcheongnam-Do (KR)

( * ) Notice: Subject to any disclaimer, the term of this patent is extended or adjusted under 35 U.S.C. 154(b) by 470 days.

(21) Appl. No.: 18/090,688

(22) Filed: Dec. 29, 2022

(65) Prior Publication Data
US 2023/0398942 A1 Dec. 14, 2023

(30) Foreign Application Priority Data
Jun. 8, 2022 (KR) ........................ 10-2022-0069380

(51) Int. Cl.
*B60R 7/04* (2006.01)
*B60R 11/00* (2006.01)

(52) U.S. Cl.
CPC ........... *B60R 7/04* (2013.01); *B60R 2011/007* (2013.01)

(58) Field of Classification Search
CPC .................. B60R 7/04; B60R 2011/007; B60R 2011/0084; B60N 2/0727; B60N 2/919; B60N 2/0825; B60N 2/0875; B60N 3/00; B60N 2/07; B60N 2/0722; B64D 11/0696; H01F 7/0242; H01F 7/0257; H01F 7/206; H01F 2017/008
USPC ............. 296/24.34, 37.1, 37.8, 65.13, 65.14; 335/296, 301
See application file for complete search history.

(56) References Cited

U.S. PATENT DOCUMENTS

| | | | |
|---|---|---|---|
| 6,135,529 A * | 10/2000 | De Angelis | B60R 7/04 224/281 |
| 11,142,097 B2 * | 10/2021 | Dry | B60R 16/027 |
| 11,827,181 B2 * | 11/2023 | An | B60R 7/04 |
| 2007/0119885 A1 * | 5/2007 | Miller | B60R 7/088 224/183 |
| 2020/0172184 A1 * | 6/2020 | Abdellatif | G05D 1/696 |

(Continued)

FOREIGN PATENT DOCUMENTS

| KR | 101125280 B1 | 3/2012 |
|---|---|---|
| KR | 2022-0075498 A | 6/2022 |

*Primary Examiner* — Amy R Weisberg
*Assistant Examiner* — Denise Lynne Esquivel
(74) *Attorney, Agent, or Firm* — Fox Rothschild LLP

(57) ABSTRACT

The present disclosure relates to a moving device, and as one embodiment of the present disclosure. The moving device includes a rail unit positioned to be embedded in a floor of a vehicle, a storage unit moved along the rail unit, a magnetic unit positioned in the storage unit and configured to be moved along the rail unit, a magnetic shield unit positioned on both side surfaces of the magnetic unit to increase adherence between the magnetic unit and the rail unit, and a fixing unit fastened to the floor and the storage unit to limit the movement of the storage unit. The magnetic unit is configured to have opposite polarities on both sides with respect to the longitudinal direction of the rail unit.

20 Claims, 6 Drawing Sheets

(56) References Cited

U.S. PATENT DOCUMENTS

2021/0086699 A1\* 3/2021 Chen .................. B60R 7/04
2022/0169182 A1\* 6/2022 An ..................... B60R 7/04

\* cited by examiner

[FIG. 1]
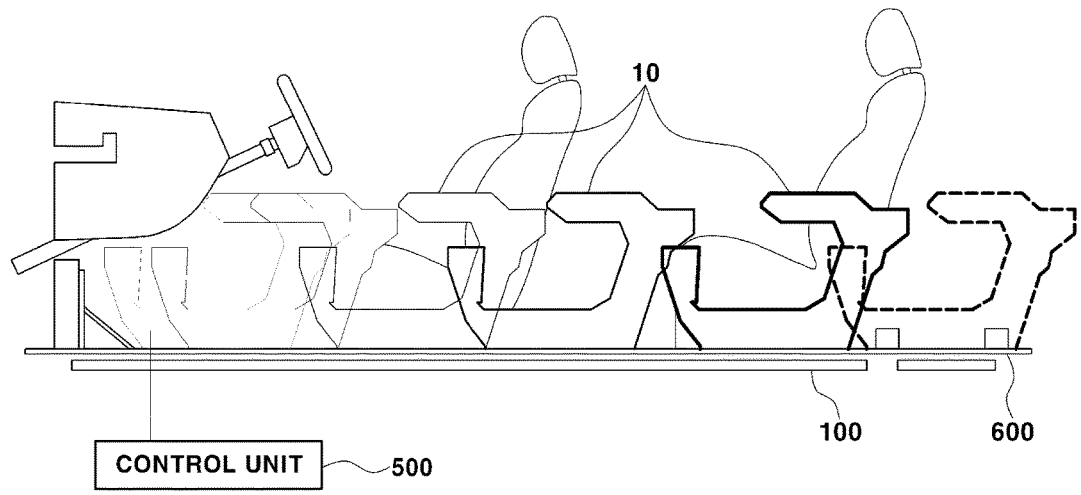
[FIG. 2]
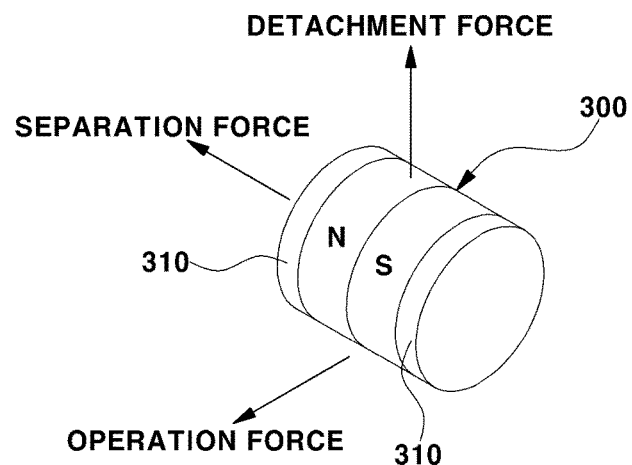

[FIG. 3]
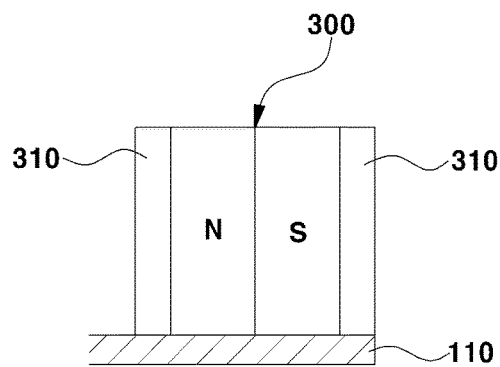
[FIG. 4]
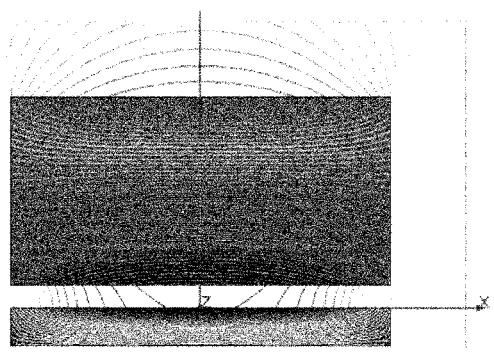 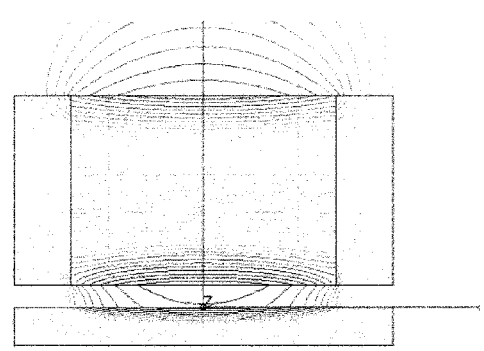
[ CONVENTIONAL ]    [ IMPROVEMENT ]

[FIG. 5]
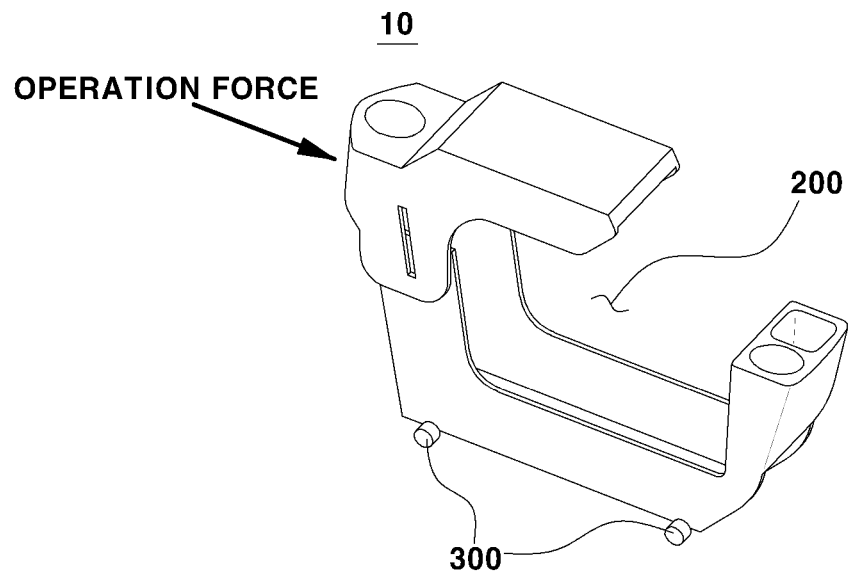
[FIG. 6]
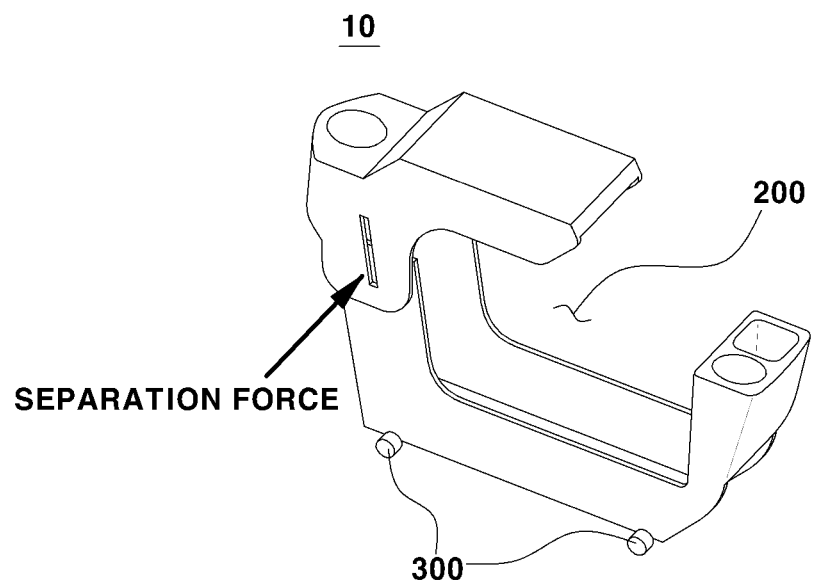

[FIG. 7]
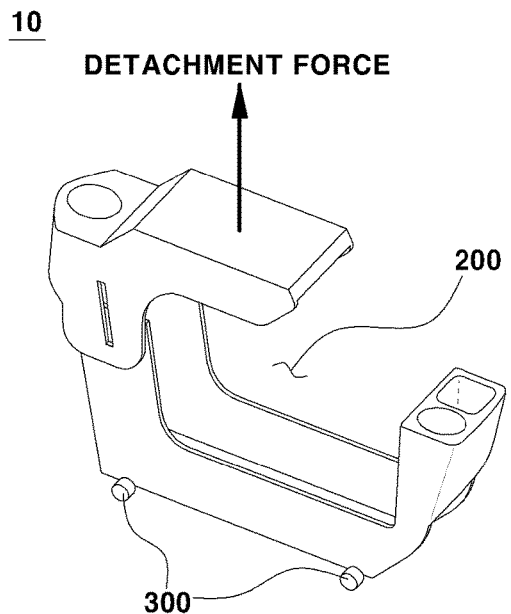
[FIG. 8]
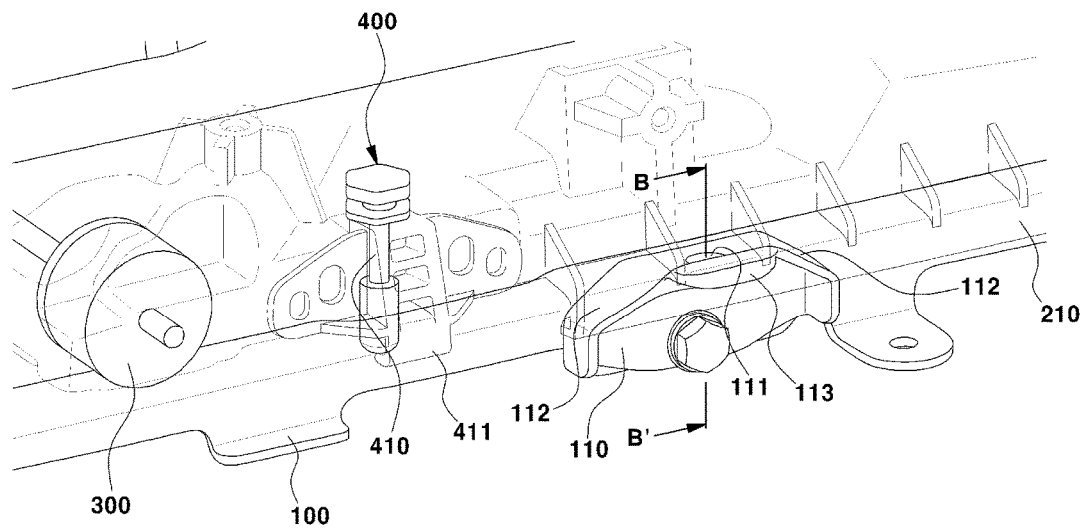

[FIG. 9]
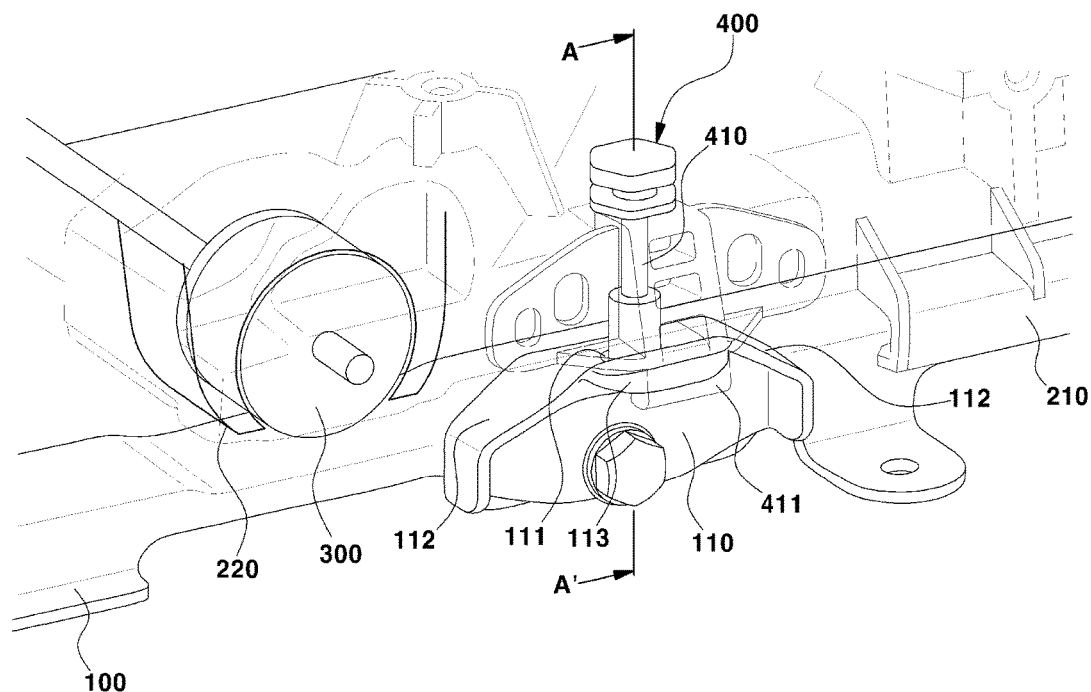

[FIG. 10]
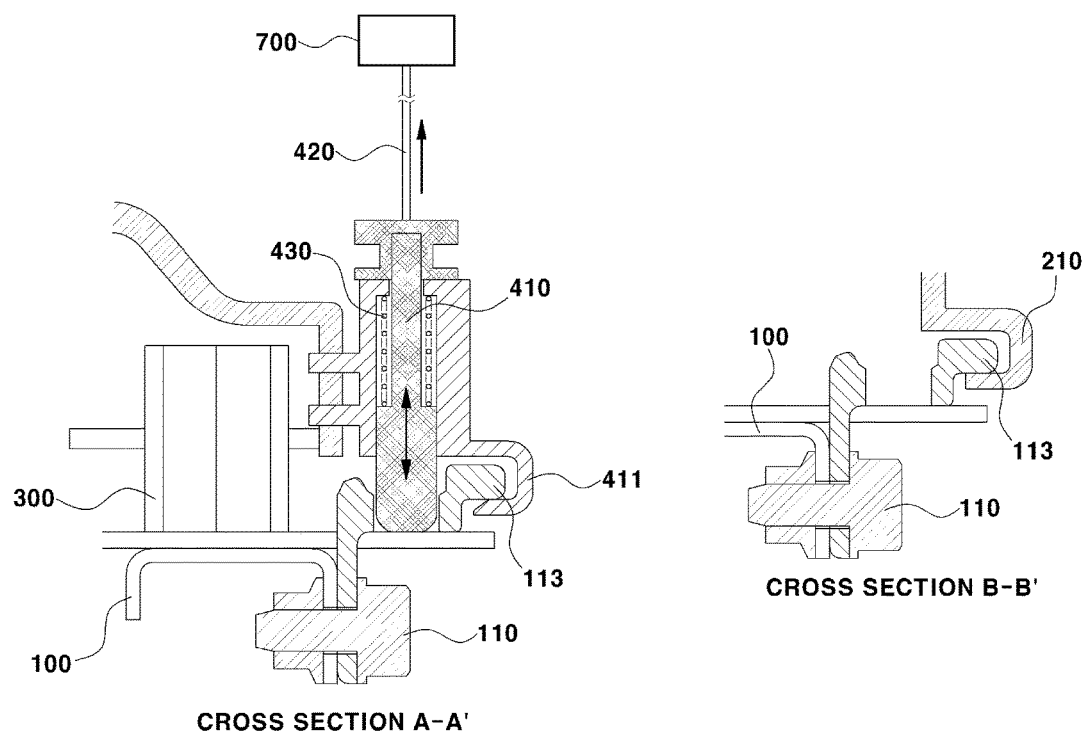

MOVING DEVICE

CROSS-REFERENCE TO RELATED APPLICATION

This application claims under 35 U.S.C. § 119(a) the benefit of Korean Patent Application No. 10-2022-0069380 filed on Jun. 8, 2022, the entire contents of which are incorporated herein by reference.

BACKGROUND

Technical Field

The present disclosure relates to a moving device, and more preferably, to a moving device in which a storage unit may be moved to correspond to a shape of a rail unit by providing the storage unit which may move along the rail unit embedded inside a floor.

Background

Recently, since the degree of freedom of a seat space inside a vehicle is provided with the advent of autonomous vehicles, in conventional vehicles, a vehicle seat has difficulty in having a configuration of implementing a change in direction or a left and right movement, and it is also difficult to find a configuration for easily adjusting a direction of the vehicle seat or moving the vehicle seat.

In this case, how easy it is to perform a displacement operation such as rotation or linear movement of the vehicle seat will be an important technical issue, and how safely the vehicle seat may be coupled to the vehicle even while having such variability will be an important technical issue, and to this end, a holding method or device for fixing the displacement of the vehicle seat to the vehicle becomes important.

Furthermore, a storage device positioned inside the vehicle along with a seat essentially requires a device which may be moved in at least one direction of the vehicle according to the arrangement of the seat and a user's request.

In other words, customers demand the movement of the storage device to various positions along an upper surface of a roof like the seat in response to the degree of freedom of indoor environments.

SUMMARY OF THE DISCLOSURE

The present disclosure has been made in efforts to solve the above problems, and an object of the present disclosure is to provide a storage device that can be moved along a rail portion through a moving device.

In addition, another object of the present disclosure is to provide a moving device that includes a fixing unit positioned in a storage device so that the movable storage device is fastened to a fixing bracket embedded in a floor and may be fixed to a rail unit in a state in which the storage device is stopped.

The objects of the present disclosure are not limited to the above-described objects, and other objects of the present disclosure not described may be understood by the following description, and seen more clearly by embodiments of the present disclosure. In addition, the objects of the present disclosure may be achieved by a means described in claims and a combination thereof.

A moving device for achieving the objects of the present disclosure includes the following configuration.

In one embodiment of the present disclosure, a moving device includes a rail unit positioned to be embedded in a floor of a vehicle, a storage unit moved along the rail unit, a magnetic unit positioned in the storage unit, and moved along the rail unit, a magnetic shield unit positioned on both side surfaces of the magnetic unit to increase adherence between the magnetic unit and the rail unit, and a fixing unit fastened to the floor and the storage unit to limit the movement of the storage unit, wherein the magnetic unit is configured to have opposite polarities on both sides with respect to the longitudinal direction of the rail unit.

In addition, the moving device further includes a protection unit positioned in the storage unit, and configured to surround both side surfaces of the magnetic unit in a movement direction. The protection unit may be made of a non-magnetic substance. The non-magnetic substance may be selected from polypropylene (PP), polyamide (PA), and aluminum.

In addition, the fixing unit includes a housing positioned on a side surface of the storage unit, a locking rod positioned inside the housing, and inserted into a fixing bracket which is fixed to and positioned on the rail unit, and a cable positioned between an upper end of the locking rod and a knob and configured so that the locking rod is moved upward.

In addition, the fixing bracket is configured to be positioned on at least one movement path of the fixing unit.

In addition, the housing is configured to surround at least a part of a protrusion positioned on a side surface of the fixing bracket.

In addition, the moving device further includes an elastic member positioned on one end of the locking rod positioned in the housing.

In addition, the fixing bracket includes a locking hole into which the locking rod is inserted and a tapered portion configured to be inclined in the longitudinal direction of the storage unit with respect to the locking hole.

In addition, the magnetic shield unit is configured to have a thickness of 3 mm or less in a width direction of the magnetic unit.

In addition, the magnetic unit is configured so that an operation force is smaller than a separation force and the separation force is smaller than a detachment force.

In addition, the moving device further includes a latching unit configured to surround a protrusion of a fixing bracket on a side surface of the storage unit. The latching unit may be positioned on the side surface of the storage device and fastened to the protrusion of the fixing bracket even when the fixing unit is spaced apart at the position corresponding to the fixing bracket.

As another embodiment of the present disclosure, a moving device includes a rail unit positioned to be embedded in a floor of a vehicle, a storage unit moved along the rail unit, a magnetic unit positioned in the storage unit, configured to have different magnetic substances on both sides with respect to a longitudinal direction of the rail unit, and moved along the rail unit, a magnetic shield unit positioned on both side surfaces of the magnetic unit to increase adherence between the magnetic unit and the rail unit, and a fixing unit fastened to the floor and the storage unit to limit the movement of the storage unit, wherein the magnetic unit is configured so that an operation force moved along the rail unit is smaller than a detachment force moved to a side surface of the magnetic unit.

In addition, the operation force is configured as a force obtained by summing a magnetic force formed in a longitudinal direction of the magnetic unit and the rail unit and a frictional force formed in a longitudinal direction of the magnetic unit and the floor.

In addition, the separation force is configured as a force obtained by summing a magnetic force formed in a lateral direction of the magnetic unit and the rail unit and a frictional force formed in a lateral direction of the magnetic unit and the floor.

In some embodiments, at least one side surface of the magnetic unit may include the magnetic shield unit made of a steel material.

In some embodiments, certain areas of both ends of the rail unit may be thicker in a height direction than a central area of the rail unit.

In some embodiments, both side surfaces of the railroad unit may be bent downward in a direction perpendicular to a plane of the rail unit.

In some embodiments, the fixing unit may be positioned to protrude from a lower end of the side surface of the storage unit, and may be spaced apart from the floor by a predetermined interval and face the floor.

The present disclosure can obtain the following effects by this embodiment and a configuration, coupling, and use relationship which will be described below.

Since the present disclosure provides a moving device, it is possible to increase a user's convenience by providing a storage device having a high degree of freedom which may be moved along an interior of a vehicle.

In addition, according to the present disclosure, the storage device is configured to be moved along a rail unit embedded in a back surface of a floor of the vehicle, thereby increasing the beauty of the interior of the vehicle.

In addition, according to the present disclosure, when the storage device is positioned at a fixed position, it is possible to achieve stability of occupants in the vehicle through a double fixing structure between a fixing unit and a fixing bracket.

As discussed, the method and system suitably include use of a controller or processer.

In another embodiment, vehicles are provided that comprise an apparatus as disclosed herein.

The above and other features of the disclosure are discussed infra.

BRIEF DESCRIPTION OF THE DRAWINGS

The above and other features of the present disclosure will now be described in detail with reference to certain exemplary examples thereof illustrated in the accompanying drawings which are given herein below by way of illustration only, and thus are not limitative of the present disclosure, and wherein:

FIG. 1 shows a side view of a vehicle including a moving device as one embodiment of the present disclosure;

FIG. 2 shows a configuration relationship between a magnetic unit and a rail unit of the moving device as one embodiment of the present disclosure;

FIG. 3 shows a side view of the magnetic unit of the moving device as one embodiment of the present disclosure;

FIG. 4 shows a change in a magnet density of the magnetic unit of the moving device as one embodiment of the present disclosure;

FIG. 5 shows an application direction of an operation force of the moving device as one embodiment of the present disclosure;

FIG. 6 shows an application direction of a separation force of the moving device as one embodiment of the present disclosure;

FIG. 7 shows an application direction of a detachment force of the moving device as one embodiment of the present disclosure;

FIG. 8 shows configurations of a fixing unit and a fixing bracket in a state in which a storage device moves as one embodiment of the present disclosure;

FIG. 9 shows the storage device at a position where the fixing unit and the fixing bracket face as one embodiment of the present disclosure; and FIG. 10 shows side cross-sectional views of a fixed area and a moving area as one embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Hereinafter, embodiments of the present disclosure will be described in more detail with reference to the accompanying drawings. The embodiments of the present disclosure may be modified in various forms, and the scope of the present disclosure should not be construed as being limited to the following embodiments. The embodiments are provided to more completely describe the present disclosure to those skilled in the art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In addition, terms such as " . . . part" and " . . . unit" described in the specification refer to a unit that processes at least one function or operation, which may be implemented by hardware or software or a combination of hardware and software.

In addition, the reason that the names of the components are classified into the first, the second, and the like in this specification is to distinguish the names of the components having the same relationship, and the following description is not necessarily limited to the order.

In addition, in this specification, an "operation force" refers to a force for moving a magnetic unit 300 in a longitudinal direction along a rail unit 100, a "separation force" refers to a force for separating the magnetic unit 300 in a lateral direction of the rail unit 100, and a "detachment force" refers to a force required to detach the magnetic unit 300 in an upward direction of the rail unit 100.

Hereinafter, embodiments will be described in detail with reference to the accompanying drawings, and in the description with reference to the accompanying drawings, the same or corresponding components are given the same reference numerals, and an overlapping description thereof will be omitted.

FIG. 1 shows a side view of a vehicle including a moving device as one embodiment of the present disclosure.

As shown, since a storage device 10 is configured to be slidably moved along an upper surface of a floor 600 of a vehicle, the rail unit 100 embedded inside the floor 600, and a storage device 10 which is moved along the rail unit 100 and includes a storage unit 200 are shown.

The storage device 10 may include the storage unit 200 configured to hold a user's luggage or portable goods, a magnetic unit 300 positioned at a lower end of the storage unit 200 and configured to move along the rail unit 100, and a fixing unit 400 formed on a back surface of the storage unit 200, positioned inside the floor 600, and popped-up and fastened to the storage unit 200.

A control unit 500 may be configured to control the movement of the storage device according to a user's input. In addition, the control unit 500 may measure a position of the storage device 10, and control an intensity of a magnetic force of the magnetic unit 300. The rail unit 100 may be positioned to be fixed to the back surface of the floor 600, and the magnetic part 300 moving in contact with an upper surface of the floor 600 may be configured to move along the rail unit 100 at a position corresponding to the rail unit 100.

As a non-magnetic substance, a thin material may be applied to the floor 600, which is to prevent a change in magnetic forces of the magnetic unit 300 and a magnetic shield unit 310 and prevent loss of the magnetic force.

In another embodiment of the present disclosure, the magnetic unit 300 may not include the separate storage unit 200, and may be configured to include a storage space or an electrical components positioned inside the magnetic unit 300.

Furthermore, in the same embodiment, since the magnetic unit 300 may be freely moved along the upper surface of the floor 600, the floor 600 may be configured to have the same physical property as that of the rail unit 100.

As shown in FIGS. 2 and 3, the magnetic unit 300 according to the present disclosure may be configured in a cylindrical shape, and may include a state configured to form different poles on both side surfaces in a longitudinal direction of the rail unit 100. In other words, the magnetic unit 300 is configured as a cylindrical roller and configured to be fastened to the storage unit 200, and thus may be configured to include at least one polarity by alternately forming N poles and S poles in a width direction of the magnetic unit 300.

In addition, in the present disclosure, thicknesses of both side surfaces of the rail unit 100 may be set to be greater than that of a central portion thereof so as to prevent the magnetic unit 300 from being deflected in both directions of the rail unit 100. More preferably, as shown, certain areas of both ends of the rail unit 100 may be configured to be thicker in a height direction than a central area, and thus may be configured so that magnetic forces formed at both ends of the rail unit 100 are relatively strongly formed.

At least one side surface of the magnetic unit 300 may include the magnetic shield unit 310 made of a steel material. More preferably, the magnetic shield unit 310 may be positioned on the magnetic unit 300 close to the end of the storage device 10, or positioned on both side surfaces of the magnetic unit 300. The magnetic shield unit 310 is configured to prevent the magnetic field applied from the magnetic unit 300 from being formed outward from the side surface of the magnetic unit 300, and shield the magnetic unit 300 to increase a magnetic flux density in an area corresponding to the end of the rail unit 100. The magnetic shield unit 310 may include all materials capable of increasing the magnetic flux densities at both ends of the magnetic unit 300. In addition, the magnetic shield unit 310 according to the present disclosure may be configured to have a thickness of 3 mm or less in the width direction of the magnetic unit 300.

Furthermore, the moving device may include a protection unit 220 positioned in the storage device 10 adjacent to the magnetic unit 300 in the longitudinal direction to prevent impurities from being introduced into the magnetic unit 300. Since the protection unit 220 may be configured as a non-magnetic substance, in one embodiment of the present disclosure, the protection unit 220 may be made of materials such as polypropylene (PP), polyamide (PA), and aluminum.

As shown in FIG. 2, the magnetic unit 300 is configured so that an operation force is applied to the magnetic unit 300 in the longitudinal direction of the rail unit 100 so that the magnetic unit 300 may be moved along the rail unit 100, a separation force may be applied to the magnetic unit 300 in a lateral direction of the rail unit 100, and a detachment force is generated in the height direction of the floor 600 on which the rail unit 100 is positioned.

In one embodiment of the present disclosure, the detachment force should have a greater magnetic force than those of the separation force and the operation force, and the separation force may require a greater magnetic force than that of the operation force.

When the thickness of the floor 600 becomes smaller, the magnetic forces required for the operation force, the separation force, and the detachment force may become greater, and when the thickness of the magnetic substance constituting the magnetic unit 300 increases and/or a thickness of a rail increases, the magnetic forces required for the operation force, the separation force, and the detachment force may become greater.

Furthermore, as shown in FIG. 4, in the case of the magnetic flux density of the magnetic part 300 including the magnetic shield unit 310, a magnetic flux density may be formed to be relatively high in an exemplary embodiment including the magnetic shield unit 310 at an outermost end of the magnetic unit 300 compared to a comparative example which does not include the magnetic shield unit 310.

In other words, in the embodiment of the present disclosure including the magnetic shield unit 310 compared to the embodiment that does not include the magnetic shield unit 310, a relatively higher operation force (separation force) may be required to separate the magnetic unit 300 in both directions of the rail unit 100.

Furthermore, the magnetic unit 300 may be set so that the magnetic force of the area close to both edges of the rail unit 100 is greater than the magnetic force of the central area, thereby preventing the magnetic unit 300 from being separated from the rail unit 100. In addition, since the rail unit 100 is configured so that its thickness increases from a central portion of the rail toward the ends of both side surfaces, the magnetic force required for the separation force is configured to become greater. More preferably, the rail unit 100 may be configured so that both side surfaces thereof are bent downward in a direction perpendicular to a plane of the rail unit 100.

In other words, according to the embodiment of the present disclosure in which the end of the rail unit 100 configured to face the magnetic shield unit 310 may be configured to be relatively thick, the cylindrical magnetic unit 300 is configured so that the separation force required to be separated from the rail unit 100 is increased. Accordingly, the storage device 10 is configured to move along the rail unit 100.

FIG. 5 shows the operation force for moving the storage device 10 along the rail unit 100 as one embodiment of the present disclosure, FIG. 6 shows the separation force for separating the storage device 10 in the lateral direction from the rail unit 100, and FIG. 7 shows the detachment force for detaching the storage device 10 in a vertical direction.

FIG. 5 shows the operation force applied to the storage device 10 as the storage device 10 moves along the rail unit 100. The operation force refers to a force applied to the storage device 10 in the longitudinal direction of the rail unit 100, and the operation force refers to a force obtained by summing the magnetic force formed in the longitudinal direction of the rail unit 100 and a frictional force at which the magnetic unit 300 of the storage device 10 forms on the floor 600.

In other words, since the operation force refers to the summed force for moving the storage device 10 in the longitudinal direction of the rail unit 100, a force greater than or equal to a force obtained by summing the frictional force of the storage device 10 and an attractive force between the magnetic unit 300 and the rail unit 100 may be required.

FIG. 6 shows the separation force for separating the storage unit 10 to both side surfaces of the rail unit 100, and the separation force may be configured as a force obtained by summing the magnetic force formed in the lateral direction between the magnetic unit 300 and the rail unit 100 and the frictional force formed between the storage device 10 and the floor 600.

In contrast, FIG. 7 shows the detachment force which is a minimum force for detaching the storage device 10 from the floor 600 in a height direction, and the detachment force may be calculated by a force obtained by summing a gravity of the storage device 10 and vertical magnetic forces of the rail unit 100 and the magnetic unit 300.

As shown in FIGS. 5 to 7, the storage device 10 may be configured not to be separated along the side surface of the storage device 10 or upward from the storage device and the storage device 10 may be configured to easily move along the rail unit 100 in the longitudinal direction. Accordingly, the operation force is configured to have a relatively smaller force than the separation force and the detachment force. Furthermore, the separation force is configured as a relatively smaller force than the detachment force.

FIG. 8 relates to configurations of the fixing unit 400 and the fixing bracket 110, and shows a state in which the fixing unit 400 is spaced apart from the fixing bracket 110 as one embodiment of the present disclosure.

The fixing unit 400 may be positioned at one end facing the floor 600 on which the rail unit 100 is positioned on the side surface of the storage device 10. More preferably, the fixing unit 400 may be positioned to protrude from a lower end of the side surface of the storage device 10, and may be configured to be spaced apart from the floor 600 by a predetermined interval and face the floor 600.

The fixing unit 400 may include a housing 411 positioned outside the storage device 10, and a locking rod 410 partially positioned inside the housing 411 and positioned to protrude along a lower end of the housing 411. The moving device may include an elastic member 430 positioned on the locking rod 410 positioned inside the housing 411, and configured so that the locking rod 410 applies a tension downward. Accordingly, the locking rod 410 is further inserted into the housing 411 along the fixing bracket 110, and the locking rod 410 is moved downward and inserted into and fixed to the fixing bracket 110 at a position corresponding to a locking hole 111.

The fixing bracket 110 may be fastened to the side surface of the rail unit 100 and at least one fixing bracket 110 may be positioned at a position where the fixing unit 400 moves. The fixing bracket 110 includes the locking hole 111 configured so that the locking rod 410 is inserted into the locking hole 111 to fix the storage device 10 and the rail unit 100, and a tapered portion 112 positioned on both side surfaces of the locking hole 111 in the longitudinal direction and configured to come into contact with a lower end of the locking rod 410. The tapered portion 112 forms an inclined surface so that its height increases from a position where it first comes into contact with the locking rod 410 to the locking hole 111. Furthermore, as shown in FIGS. 9 and 10, the locking rod 410 moves in the height direction along the tapered portion 112, and is configured to be inserted into the locking hole 111 at a position facing the locking hole 111.

One end of the inside of the housing 411 of the locking rod 410 may include a cable 420 which is fastened to a knob 700 to apply a height-wise tension to the locking rod 410. The cable 420 passes through the housing 411 and is positioned to be fastened to an upper end of the locking rod 410, and the locking rod 410 is moved to an upper end through the cable 420 when a user operates the knob 700. Furthermore, when the tension is applied from the cable 420 and the locking rod 410 is moved to one end close to the upper end of the housing 411, the elastic member 430 is converted to a compressed state and the locking rod 410 is returned to a state in which the lower end thereof protrudes to the outside of the housing 411 in a state in which the tension application of the cable 420 is released.

The housing 411 may be fastened to a protrusion 113 of the fixing bracket 110 at a position corresponding to the fixing bracket 110 and configured to limit the movement of the storage device 10 in the height direction. More preferably, the moving device includes a latching unit 210 positioned on the side surface of the storage device 10 and fastened to the protrusion 113 of the fixing bracket 110 even when the fixing unit 400 is spaced apart at the position corresponding to the fixing bracket 110. Accordingly, the protrusion 113 positioned on the fixing bracket 110 may limit the height and lateral movement of the storage device 10 at a position where the fixing unit 400 and the fixing bracket 110 correspond to each other, and limit the movement of the storage device 10 in the height direction because the storage device 10 may be moved in a state in which the latching unit 210 surrounds the protrusion 113 in a process in which the storage device 10 is moved.

FIGS. 9 and 10 show a fixed relationship between the storage device 10 and the fixing bracket 110 when the fixing unit 400 is moved to a position corresponding to the fixing bracket 110.

As shown, when the storage device 10 is moved in the longitudinal direction of the rail unit 100 and moved to the fixed position of the storage device 10, the locking rod 410 may be converted into a state of being inserted into the locking hole 111 in the fixing unit 400 and the fixing bracket 110.

Furthermore, in a cross section taken along line A-A', the housing 411 of the fixing unit 400 may be configured to surround at least a part of the protrusion 113 positioned on the side surface of the fixing bracket 110. Accordingly, there may be provided a double fixing structure in which the locking rod 410 is fastened to the locking hole 111 and at the same time, the housing 411 is fastened to the fixing bracket 110.

The locking hole 111 may be configured in a shape in which the fixing bracket 110 protrudes to an upper end of the floor 600 and formed between the protrusions 113, and a back surface of the locking hole 111 into which the locking rod 410 is inserted may be configured to have the floor 600 or a plane substantially parallel to the floor 600.

In addition, when the latching unit 210 formed on the side surface of the storage device 10 is moved to the position corresponding to the protrusion 113 of the fixing bracket 110, like a cross section taken along line B-B', the protrusion 113 may be inserted into the latching unit 210 and the storage device 10 may be moved, thereby limiting the separation of the storage device 10 in the height direction.

As described above, since the present disclosure provides the fixing unit 400 which may be selectively inserted into the fixing bracket 110 in response to the operation force of the magnetic unit 300, the present disclosure provides the moving device including the selective fixing structure of the storage device 10 which moves in the longitudinal direction of the rail unit 100.

The above detailed description is illustrative of the present disclosure. In addition, the above description shows and describes preferred embodiments of the present disclosure, and the present disclosure may be used in various other combinations, modifications, and environments. In other words, changes or modifications are possible within the scope of the concept of the disclosure disclosed in this specification, the scope equivalent to the disclosed contents, and/or within the scope of technique or knowledge in the art. The described embodiments describe the best mode for implementing the technical spirit of the present disclosure, and various changes required in specific applications and uses of the present disclosure are possible. Accordingly, the detailed description of the present disclosure is not intended to limit the present disclosure to the disclosed embodiments. In addition, the appended claims should be construed as also including other embodiments.

What is claimed is:

1. A moving device comprising:
    a rail unit positioned to be embedded in a floor of a vehicle;
    a storage unit configured to be moved along the rail unit;
    a magnetic unit positioned in the storage unit, and configured to be moved along the rail unit;
    a magnetic shield unit positioned on both side surfaces of the magnetic unit to increase a magnetic flux density between the magnetic unit and the rail unit; and
    a fixing unit fastened to the floor and the storage unit to limit the movement of the storage unit,
    wherein the magnetic unit has opposite polarities on both sides with respect to the longitudinal direction of the rail unit.

2. The moving device of claim 1, further comprising a protection unit positioned in the storage unit, and configured to surround both side surfaces of the magnetic unit in a movement direction.

3. The moving device of claim 2, wherein the protection unit is made of a non-magnetic substance.

4. The moving device of claim 3, wherein the non-magnetic substance is selected from polypropylene (PP), polyamide (PA), and aluminum.

5. The moving device of claim 1,
    wherein the fixing unit comprises:
    a housing positioned on a side surface of the storage unit;
    a locking rod positioned inside the housing, and inserted into a fixing bracket which is fixed to and positioned on the rail unit; and
    a cable positioned between an upper end of the locking rod and a knob and configured so that the locking rod is moved upward.

6. The moving device of claim 5,
    wherein the fixing bracket is configured to be positioned on at least one movement path of the fixing unit.

7. The moving device of claim 5,
    wherein the housing is configured to surround at least a part of a protrusion positioned on a side surface of the fixing bracket.

8. The moving device of claim 5,
    further comprising an elastic member positioned on one end of the locking rod positioned in the housing.

9. The moving device of claim 5,
wherein the fixing bracket comprises:
a locking hole into which the locking rod is inserted; and
a tapered portion configured to be inclined in the longitudinal direction of the storage unit with respect to the locking hole.

10. The moving device of claim 1,
wherein the magnetic shield unit is configured to have a thickness of 3 mm or less in a width direction of the magnetic unit.

11. The moving device of claim 1, wherein at least one side surface of the magnetic unit may include the magnetic shield unit made of a steel material.

12. The moving device of claim 1,
wherein the magnetic unit is configured so that an operation force is smaller than a separation force and the separation force is smaller than a detachment force.

13. The moving device of claim 1, further comprising a latching unit configured to surround a protrusion of a fixing bracket on a side surface of the storage unit.

14. The moving device of claim 13, wherein the latching unit is positioned on the side surface of the storage device and fastened to the protrusion of the fixing bracket even when the fixing unit is spaced apart at the position corresponding to the fixing bracket.

15. The moving device of claim 1, wherein certain areas of both ends of the rail unit is thicker in a height direction than a central area of the rail unit.

16. The moving device of claim 1, wherein both side surfaces of the railroad unit are bent downward in a direction perpendicular to a plane of the rail unit.

17. The moving device of claim 1, wherein the fixing unit is positioned to protrude from a lower end of the side surface of the storage unit, and is spaced apart from the floor by a predetermined interval and face the floor.

18. A moving device comprising:
a rail unit positioned to be embedded in a floor of a vehicle;
a storage unit configured to be moved along the rail unit;
a magnetic unit positioned in the storage unit, configured to have different magnetic substances on both sides with respect to a longitudinal direction of the rail unit, and configured to be moved along the rail unit;
a magnetic shield unit positioned on both side surfaces of the magnetic unit to increase adherence between the magnetic unit and the rail unit; and
a fixing unit fastened to the floor and the storage unit to limit the movement of the storage unit,
wherein the magnetic unit is configured so that an operation force moved along the rail unit is smaller than a detachment force moved to a side surface of the magnetic unit.

19. The moving device of claim 18,
wherein the operation force is configured as a force obtained by summing a magnetic force formed in a longitudinal direction of the magnetic unit and the rail unit and a frictional force formed in a longitudinal direction of the magnetic unit and the floor.

20. The moving device of claim 18,
wherein the separation force is configured as a force obtained by summing a magnetic force formed in a lateral direction of the magnetic unit and the rail unit and a frictional force formed in a lateral direction of the magnetic unit and the floor.

* * * * *